United States Patent
So

(10) Patent No.: US 8,213,948 B2
(45) Date of Patent: Jul. 3, 2012

(54) APPARATUS AND METHOD FOR ALLOCATING RESOURCES IN A WIRELESS COMMUNICATION SYSTEM

(75) Inventor: Jae-Woo So, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1309 days.

(21) Appl. No.: 11/766,877

(22) Filed: Jun. 22, 2007

(65) Prior Publication Data

US 2007/0298809 A1    Dec. 27, 2007

(30) Foreign Application Priority Data

Jun. 27, 2006 (KR) ................. 10-2006-0057803

(51) Int. Cl.
*H04W 72/00* (2009.01)
(52) U.S. Cl. ............ 455/452.1; 370/343; 370/329; 370/341; 370/437; 370/442; 455/464; 455/509
(58) Field of Classification Search .......... 370/343, 370/329, 341, 437, 442; 455/450, 464, 509
See application file for complete search history.

(56) References Cited

U.S. PATENT DOCUMENTS

| | | | | |
|---|---|---|---|---|
| 5,526,346 A * | 6/1996 | Abiven | ............ | 370/295 |
| 6,792,274 B1 * | 9/2004 | Kapanen | ............ | 455/450 |
| 6,895,039 B2 * | 5/2005 | Kuzminskiy et al. | ......... | 375/150 |
| 6,963,544 B1 * | 11/2005 | Balachandran et al. | ...... | 370/281 |
| 7,230,909 B1 * | 6/2007 | Raissinia et al. | ............ | 370/206 |
| 7,385,943 B2 * | 6/2008 | Niddam | ............ | 370/321 |
| 7,430,418 B2 * | 9/2008 | Kang et al. | ............ | 455/436 |
| 2002/0151316 A1 * | 10/2002 | Kato | ............ | 455/466 |
| 2004/0116143 A1 * | 6/2004 | Love et al. | ............ | 455/522 |
| 2005/0101326 A1 * | 5/2005 | Kang et al. | ............ | 455/436 |
| 2005/0107036 A1 * | 5/2005 | Song et al. | ............ | 455/23 |
| 2005/0286408 A1 * | 12/2005 | Jin et al. | ............ | 370/208 |
| 2006/0072518 A1 * | 4/2006 | Pan et al. | ............ | 370/335 |
| 2007/0097910 A1 * | 5/2007 | Ji et al. | ............ | 370/329 |
| 2007/0230405 A1 * | 10/2007 | Yin et al. | ............ | 370/335 |
| 2008/0198785 A1 * | 8/2008 | Huang et al. | ............ | 370/312 |
| 2009/0305711 A1 * | 12/2009 | Rinne et al. | ............ | 455/450 |

FOREIGN PATENT DOCUMENTS

| KR | 10-2005-0062333 A | 6/2005 |
|---|---|---|
| KR | 10-2006-0078667 A | 7/2005 |
| KR | 10-2007-0075839 A | 7/2007 |
| KR | 10-2007-0119131 A | 12/2007 |

* cited by examiner

*Primary Examiner* — Kamran Afshar
*Assistant Examiner* — Edward Zhang
(74) *Attorney, Agent, or Firm* — Jefferson IP Law, LLP

(57) ABSTRACT

An apparatus and method for allocating resources in a wireless communication system are provided. The apparatus and method include a BS for allocating downlink resources periodically to predetermined MSs, for generating resource allocation messages with resource allocation information for the MSs, and for transmitting control information including the resource allocation messages to the MSs. Accordingly, the apparatus and method more efficiently allocate resources in a wireless communication system.

39 Claims, 10 Drawing Sheets

APPARATUS AND METHOD FOR ALLOCATING RESOURCES IN A WIRELESS COMMUNICATION SYSTEM

PRIORITY

This application claims priority under 35 U.S.C. § 119 (a) to a Korean patent application filed on Jun. 27, 2006 in the Korean Intellectual Property Office and assigned Serial No. 2006-57803, the entire disclosure of which is hereby incorporated by reference.

BACKGROUND OF THE INVENTION

1. Field of the Invention

The present invention relates generally to an apparatus and method for allocating resources in a wireless communication system. More particularly, the present invention relates to an apparatus and method for allocating and releasing downlink resources.

2. Description of the Related Art

Many technologies have been proposed as candidates for high-speed wireless mobile communications. Among them, Orthogonal Frequency Division Multiplexing (OFDM) is considered the most promising future-generation wireless communication technology. OFDM has been adopted as a standard for Institute of Electrical and Electronics Engineers (IEEE) 802.16 Wireless Metropolitan Area Network (WMAN) and it is expected that OFDM will be adopted for most wireless communication by 2010.

In an OFDM-Broadband Wireless Access (BWA) system, a Base Station (BS) transmits information describing downlink/uplink resource allocation in every frame in order to configure the downlink/uplink effectively and freely. The information is delivered by a MAP message in an IEEE 802.16 system.

For downlink data transmission, the BS allocates downlink resources to a destination Mobile Station (MS) and transmits a DownLink-MAP (DL-MAP) Information Element (IE) with resource allocation information to the MS. The downlink resources are two-dimensional. For example, they take the form of symbols and subchannels. A symbol is defined in time and a subchannel is defined in frequency. In general, a basic unit of downlink resource allocation is a slot and the amount of resources is represented as the number of slots. The MS can receive downlink data from the BS in the allocated resources.

FIG. 1 illustrates a conventional downlink resource allocation method in a wireless communication system.

A frame includes a DL frame and an UpLink (UL) frame. The DL frame carries data from a BS to MSs and the UL frame carries data from the MSs to the BS in predetermined areas. The DL frame includes a preamble, a Frame Control Header (FCH), a DL-MAP, a UL-MAP, and DL data bursts. The preamble is used for initial synchronization and cell search in the MSs and the FCH provides information describing the basic configuration of the frame. The DL-MAP includes information indicating DL data burst areas and the UL-MAP includes information describing the configuration of the UL frame.

As described above, the MAP messages with resource allocation information are transmitted in every frame because a plurality of MSs reside in a cell and have mobility. In other words, because the MSs are in time-varying channel statuses, the BS should schedule resources for the MSs and notify them of the scheduling results in every frame.

The MSs obtain knowledge of the frame configuration and the allocated resources by receiving the DL-MAP and the UL-MAP in every frame from the BS. MAP IEs in the DL-MAP and the UL-MAP are mapped to data bursts in a one-to-one correspondence.

Referring to FIG. 1, a BS allocates 24 DL slots, 8 DL slots, 9 DL slots, and 10 DL slots in the form of rectangles to four MSs, respectively by four DL-MAP IEs. Each DL-MAP IE includes information about the number of allocated slots. Each of the MSs obtains knowledge of resources allocated to the other MSs by sequentially interpreting the DL-MAP IEs, finds the start of resources allocated to the MS, and counts slots as indicated by the slot number, starting from the start to thereby determine the allocated resources for the MS. The DL-MAP IE includes a Connection Identification (CID) that identifies a service and an MS, an Uplink Interval Usage Code (UIUC) indicating a modulation scheme, an offset indicating the start of allocated slots, a duration indicating the number of allocated slots, and a repetition coding indication that indicates the number of iterative codings.

If the BS is to allocate the same downlink resources to the four MSs in each frame, it should broadcast the four DL-MAP IEs illustrated in FIG. 1 in each frame. For example, in the case of a service that transmits downlink data periodically (e.g. Voice over Internet Protocol (VoIP)), the BS should broadcast DL-MAP IEs in every frame, resulting in the unnecessary consumption of resources.

The IEEE 802.16 system allows maximal freedom in frame configuration by defining a minimum transmission unit (data burst) by one subchannel and one symbol on the downlink. However, such higher freedom requires a larger amount of control information. If data for a plurality of users coexist in one frame, information that is delivered to the users by a DL-MAP and a UL-MAP imposes a large overhead. In the worst case scenario, only a very small amount of resources are available for actual traffic and thus system throughput is decreased.

SUMMARY OF THE INVENTION

An object of the present invention is to address at least the above problems and/or disadvantages and to provide at least the advantages described below. Accordingly, an aspect of the present invention is to provide an apparatus and method for allocating resources in a wireless communication system.

Another aspect of the present invention is to provide an apparatus and method for reducing the amount of broadcast control information in a wireless communication system.

A further aspect of the present invention is to provide an apparatus and method for allocating downlink resources periodically in a wireless communication system.

Still another aspect of the present invention is to provide an apparatus and method for allocating downlink resources periodically for a service characterized by periodic packet generation in a wireless communication system.

According to an aspect of the present invention, a method for allocating resources in a BS in a wireless communication system is provided. As part of the method, downlink resources are periodically allocated to an MS, resource allocation messages with resource allocation information are generated for the MSs, and control information including the resource allocation messages is transmitted to the MSs.

According to another aspect of the present invention, a method for receiving data in an MS in a wireless communication system is provided. As a part the method, control information is received from a BS and interpreted and downlink data is received using downlink resources allocated to the MS with a time period, when the downlink resources are allocated periodically.

According to a further aspect of the present invention, an apparatus for allocating resources in a BS in a wireless communication system is provided. The apparatus includes a resource allocator that allocates downlink resources periodically to MSs, and a control information generator that generates resource allocation messages with resource allocation information for the MSs and generates control information including the resource allocation messages.

According to still another aspect of the present invention, an apparatus for receiving data in an MS in a wireless communication system is provided. The apparatus includes a control information interpreter that interprets control information received from a BS and a data receiver, when downlink resources are allocated periodically to the MS, and that receives downlink data using the allocated downlink resources with a time period.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention provides an apparatus and method for periodically allocating downlink resources in a wireless communication system. While the present invention is described in the context of an OFDM or Orthogonal Frequency Division Multiple Access (OFDMA) communication system using multiple carriers, it is to be understood that downlink Periodic Allocation (PA) of the present invention is applicable to other communication systems.

Figure 1:
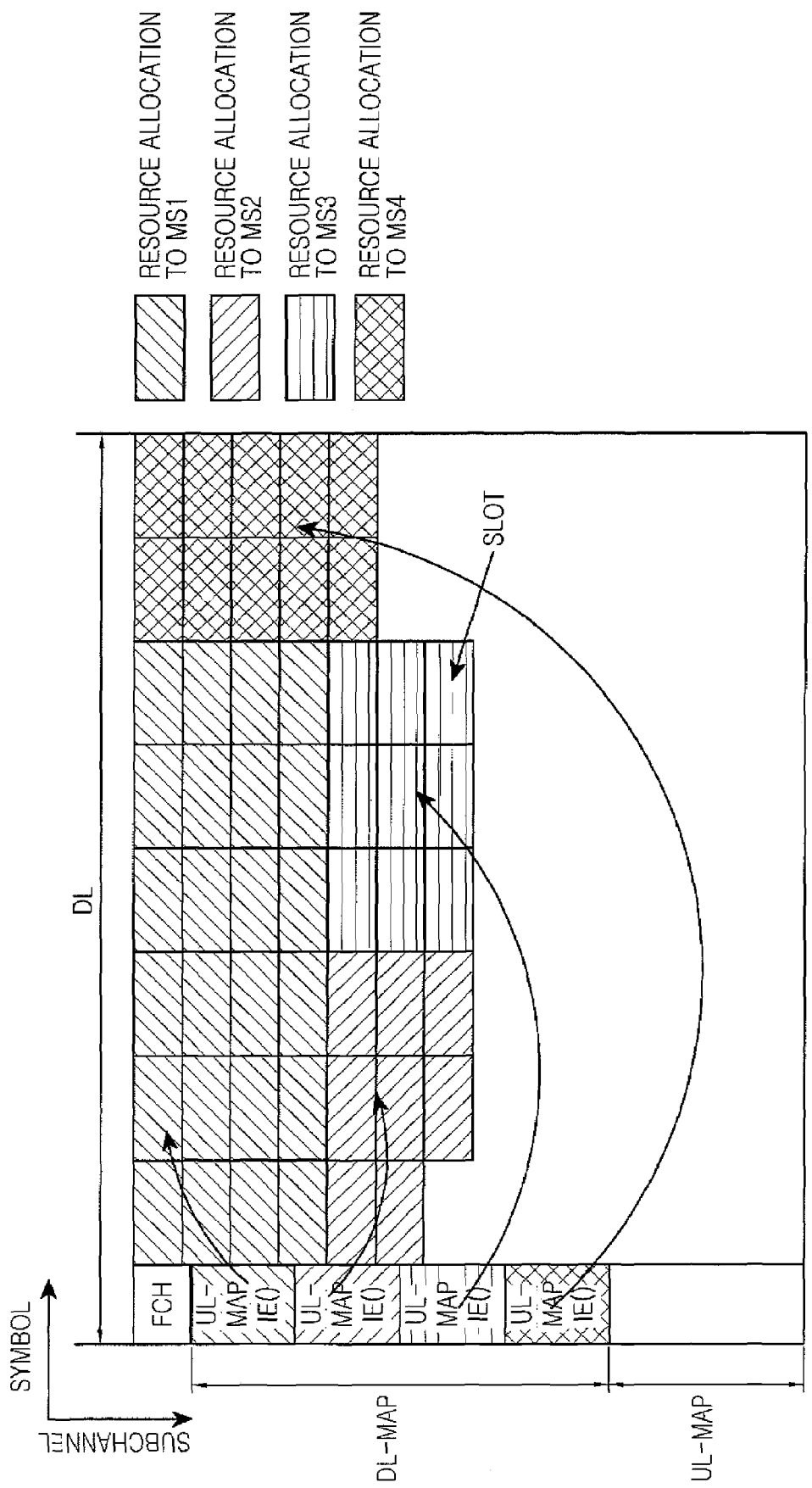
FIG. 1 illustrates a conventional downlink resource allocation method in a wireless communication system.
Figure 2:
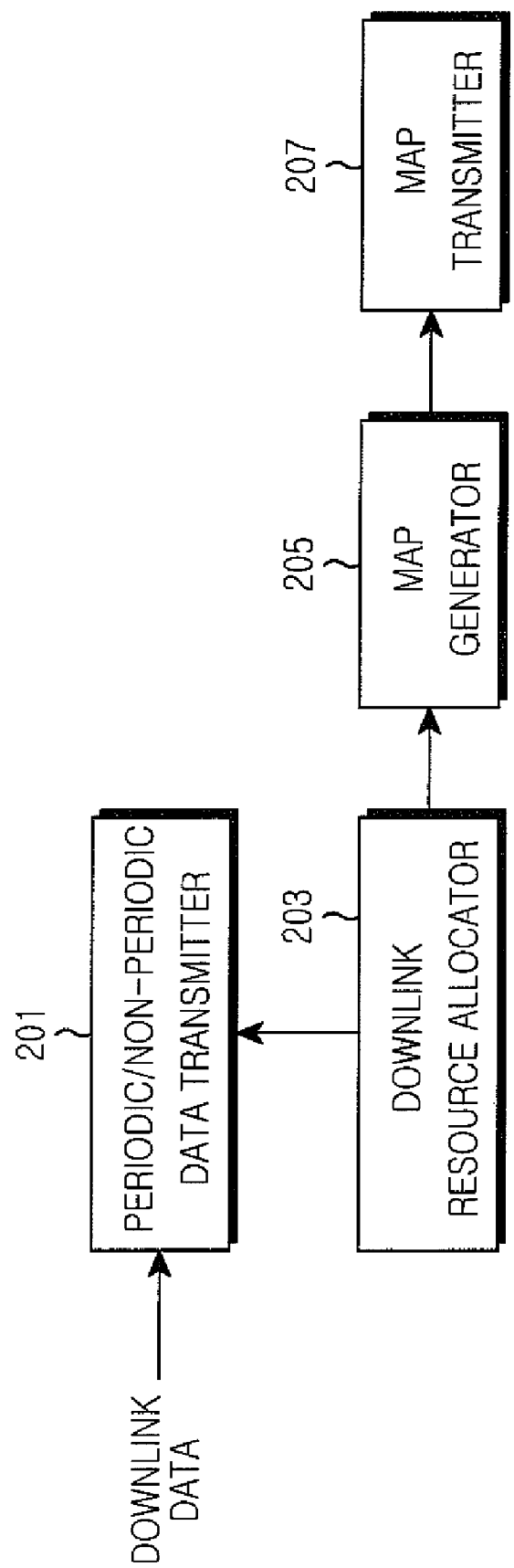
FIG. 2 is a block diagram illustrating a BS according to an exemplary embodiment of the present invention.

FIG. 2 is a block diagram illustrating a BS according to an exemplary embodiment of the present invention. The BS includes a periodic/non-periodic data transmitter 201, a downlink resource allocator 203, a MAP generator 205, and a MAP transmitter 207.

Referring to FIG. 2, the periodic/non-periodic data transmitter 201 encodes and modulates periodic/non-periodic data received from a higher layer in a predetermined scheme. The transmitter 201 maps the modulated data to downlink resources allocated to MSs, processes the mapped data by OFDM modulation, upconverts the OFDM-modulated data to Radio Frequency (RF) signals, and transmits the RF signals to the MSs through an antenna (not shown).

The downlink resource allocator 203 determines the MSs to which the downlink resources are to be allocated, allocates the downlink resources to the MSs according to the channel information and service types of the respective MSs, and provides the downlink resource allocation result to the MAP generator 205 and the periodic/non-periodic data transmitter 201. In addition to its typical functions, the downlink resource allocator 203 allocates periodic downlink resources to MSs that require periodic data transmission in a predetermined allocation scheme according to an exemplary embodiment of the present invention.

The MAP generator 205 generates resource allocation messages for the respective MSs according to the downlink resource allocation result and creates MAP information including the resource allocation messages.

The MAP transmitter 207 encodes and modulates the MAP information received from the MAP generator 205 in a predetermined scheme, maps the modulated MAP information to predetermined downlink resources (e.g. a front part of a frame), OFDM-modulates the mapped MAP information, upconverts the OFDM-modulated MAP information to an RF signal, and broadcasts the RF signal to the MSs through the antenna.

Figure 3:
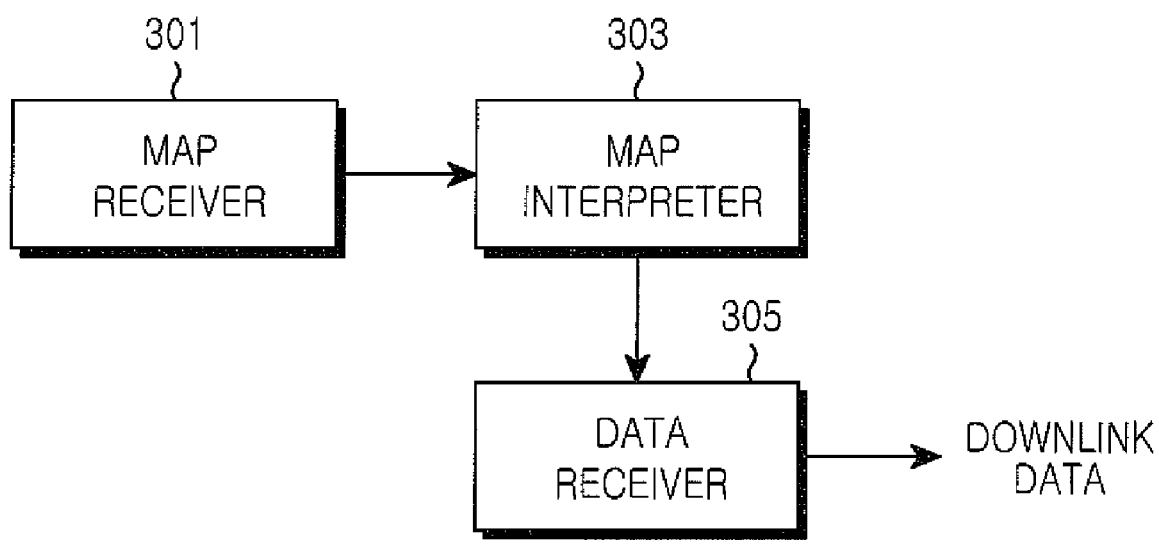
FIG. 3 is a block diagram illustrating an MS according to an exemplary embodiment of the present invention.

FIG. 3 is a block diagram of an MS according to an exemplary embodiment of the present invention. The MS includes a MAP receiver 301, a MAP interpreter 303, and a data receiver 305.

Referring to FIG. 3, the MAP receiver 301 extracts MAP data from OFDM-demodulated data of a predetermined area in a frame in the data receiver 305, demodulates and decodes the MAP data in a predetermined scheme, and provides the resulting MAP information to the MAP interpreter 303.

The MAP interpreter 303 extracts information about a resource allocation scheme and resource allocation information from the MAP information by interpreting the MAP information.

After OFDM modulation of an RF signal received from the BS, the data receiver 305 receives downlink data in slots of the frame according to the extracted information and demodulates and decodes the downlink data in a predetermined scheme.

Figure 4:
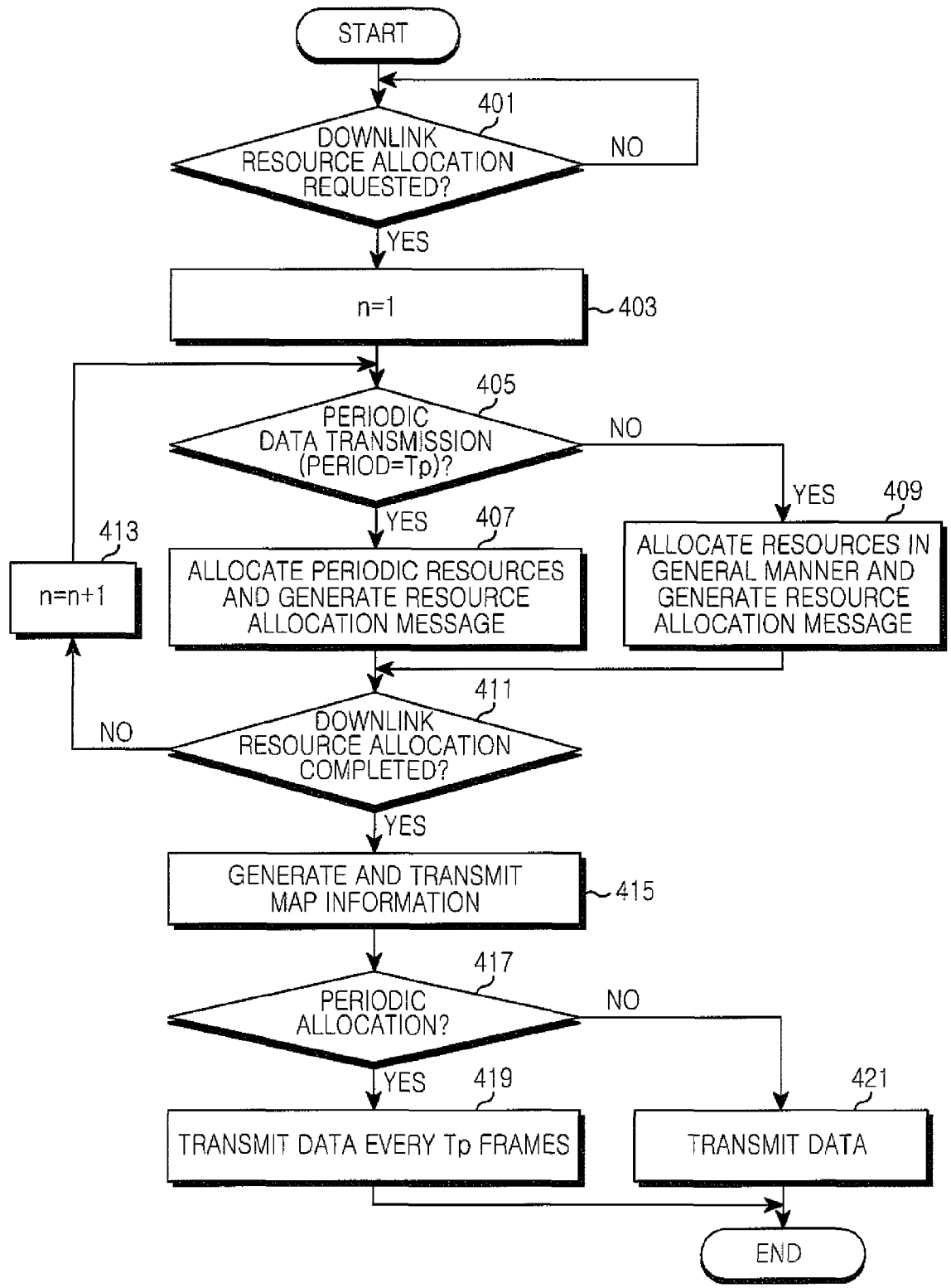
FIG. 4 is a flowchart illustrating an operation of a BS for periodically allocating downlink resources in a wireless communication system according to an exemplary embodiment of the present invention.

FIG. 4 is a flowchart illustrating an operation of a BS for periodically allocating downlink resources in a wireless communication system according to an exemplary embodiment of the present invention.

Referring to FIG. 4, the BS monitors whether downlink resource allocation has been requested in step 401. If the downlink resource allocation has been requested, the BS determines MSs that require downlink resource allocation and sets an MS index n to 1 in step 403.

In step 405, the BS identifies the service type of the nth MS and determines whether periodic data transmission (e.g. period=Tp) is required for the nth MS. For example, a service characterized by periodic packet generation such as VoIP can be defined as a service requiring periodic resource allocation. While a decision is made as to whether the periodic resource allocation is required according to service type, it is a mere exemplary application. Hence, the decision can be made when an MS requests periodic resource allocation. Nonetheless, the BS finally determines whether to allocate resources periodically.

When determining that the nth MS needs periodic data transmission, the BS allocates periodic resources to the nth MS in the Periodic Allocation (PA) method of an exemplary embodiment of the present invention and generates a resource allocation message to be transmitted to the nth MS in step 407. On the other hand, when determining that the nth MS does not need periodic data transmission, the BS allocates resources to the nth MS in a general resource allocation method and generates a resource allocation message to be transmitted to the nth MS in step 409.

The general resource allocation method refers to allocating resources in the form of a rectangle to an MS, starting from the first slot of a DL frame. Meanwhile, the PA method can be considered in three ways: PA based on two-dimensional absolute coordinates, PA based on time-reverse ordered slots, and PA based on frequency-axis slots.

Figure 8:
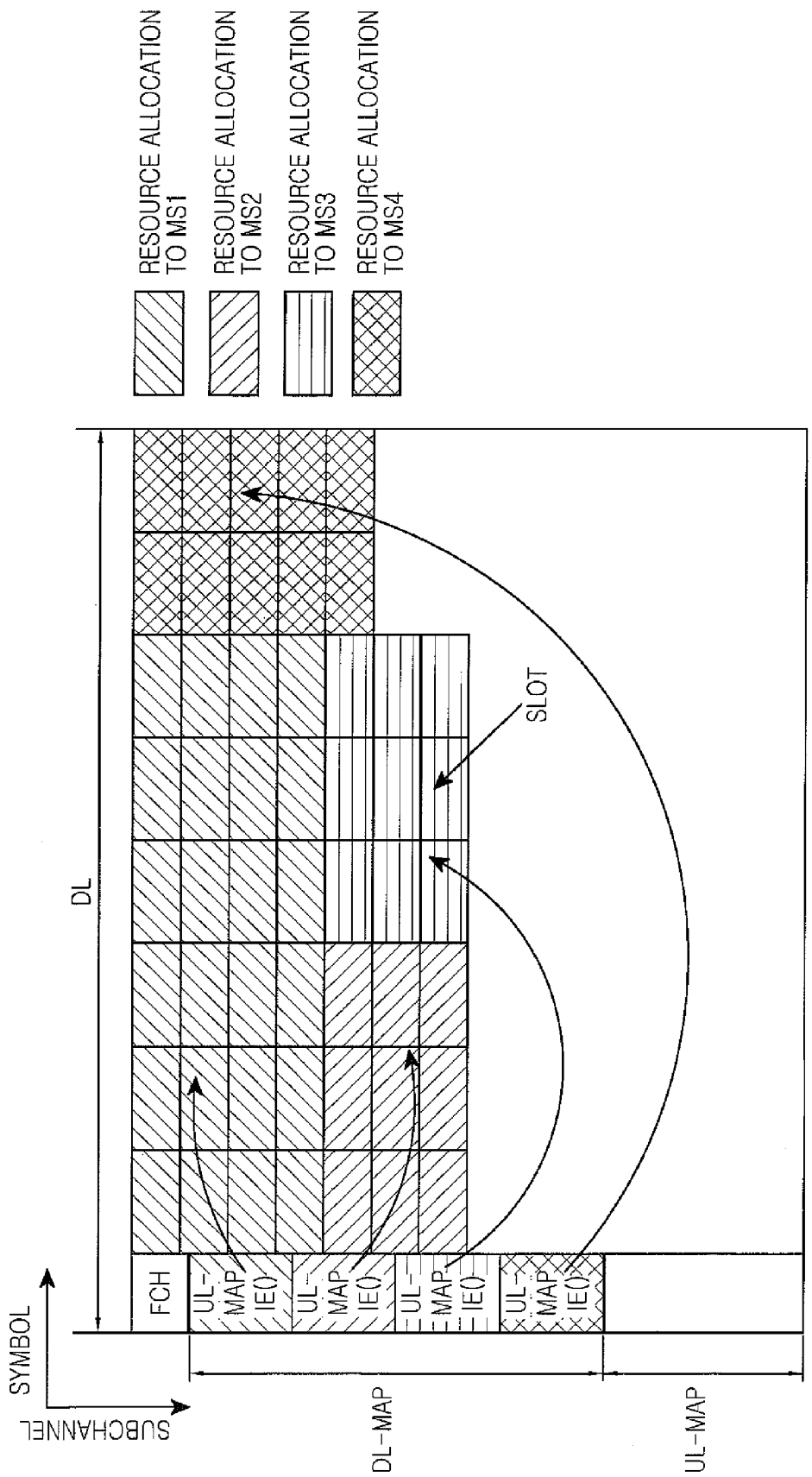
FIG. 8 is a view illustrating a downlink resource allocation method in a wireless communication system according to an exemplary embodiment of the present invention.

The PA based on two-dimensional absolute coordinates is a scheme for allocating the remaining resources after general resource allocation to MSs requiring periodic resource allocation in the form of rectangles. Referring to FIG. 8, assuming that resources are allocated to MS1 in the conventional manner and periodic resources are allocated to MS2, MS3 and MS4, the BS allocates a rectangle of 24 slots in a DL frame, starting from slot #1 to MS1, two 9-slot rectangles to MS2 and MS3, respectively, and a 10-slot rectangle to MS4.

Figure 9:
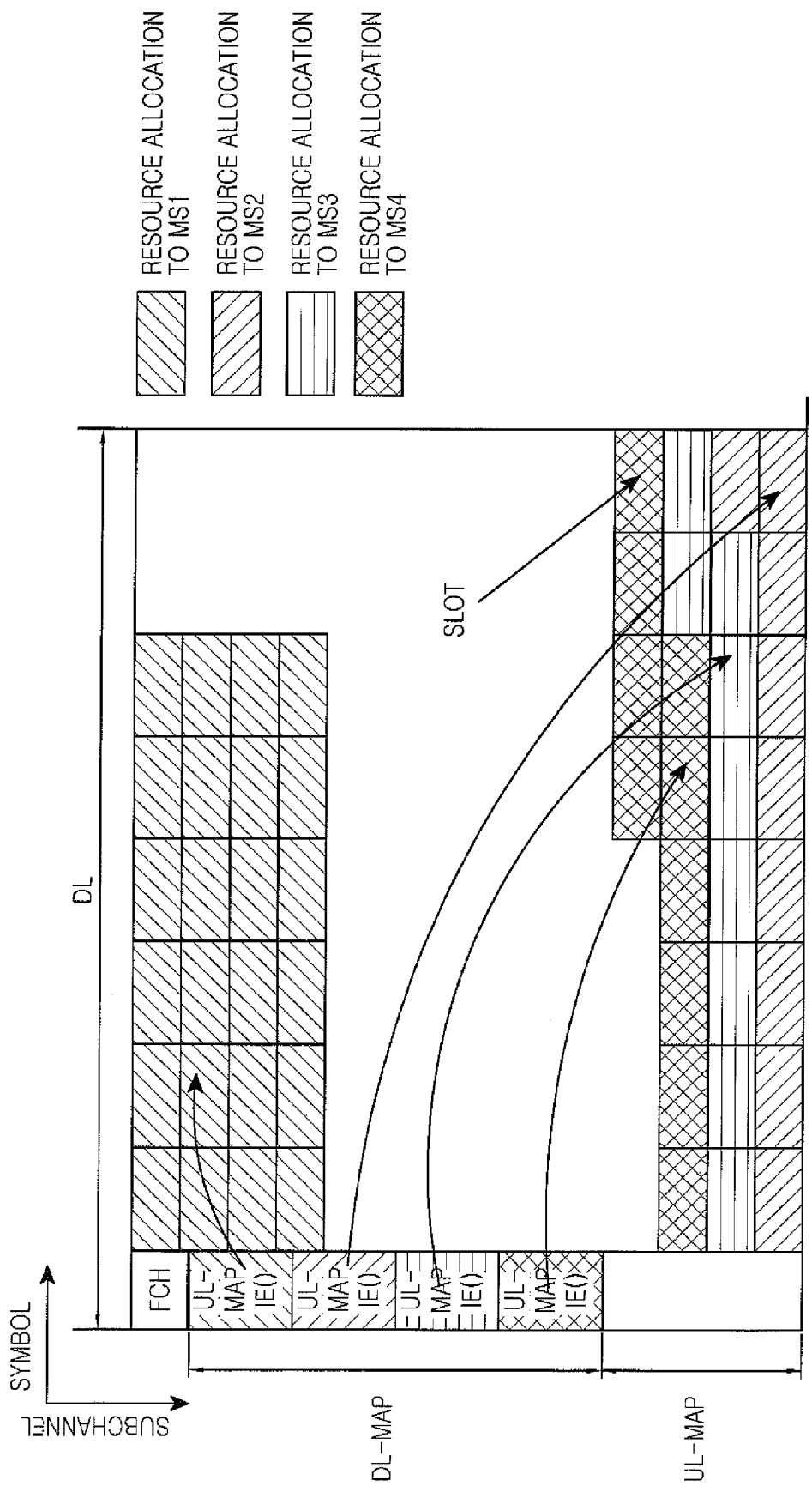
FIG. 9 is a view illustrating a downlink resource allocation method in a wireless communication system according to another exemplary embodiment of the present invention.

The PA based on time-reverse ordered slots allocates the remaining resources after general resource allocation to MSs requiring periodic resource allocation in a time-reverse order, that is, sequentially starting from the last slot of a DL frame. Referring to FIG. 9, assuming that resources are allocated to MS1 in the general manner and periodic resources are allocated to MS2, MS3 and MS4, the BS allocates a rectangle of 24 slots in a DL frame, starting from slot #1 to MS1. Then, stating from the last slot, the BS allocates 9 slots to MS2, 9 slots counted from the last 10th slot to MS3, and 10 slots counted from the last 19th slot to MS4. Although the periodic resources are allocated in the time-reverse order, actual packet transmission is carried out in the order of time.

Figure 10:
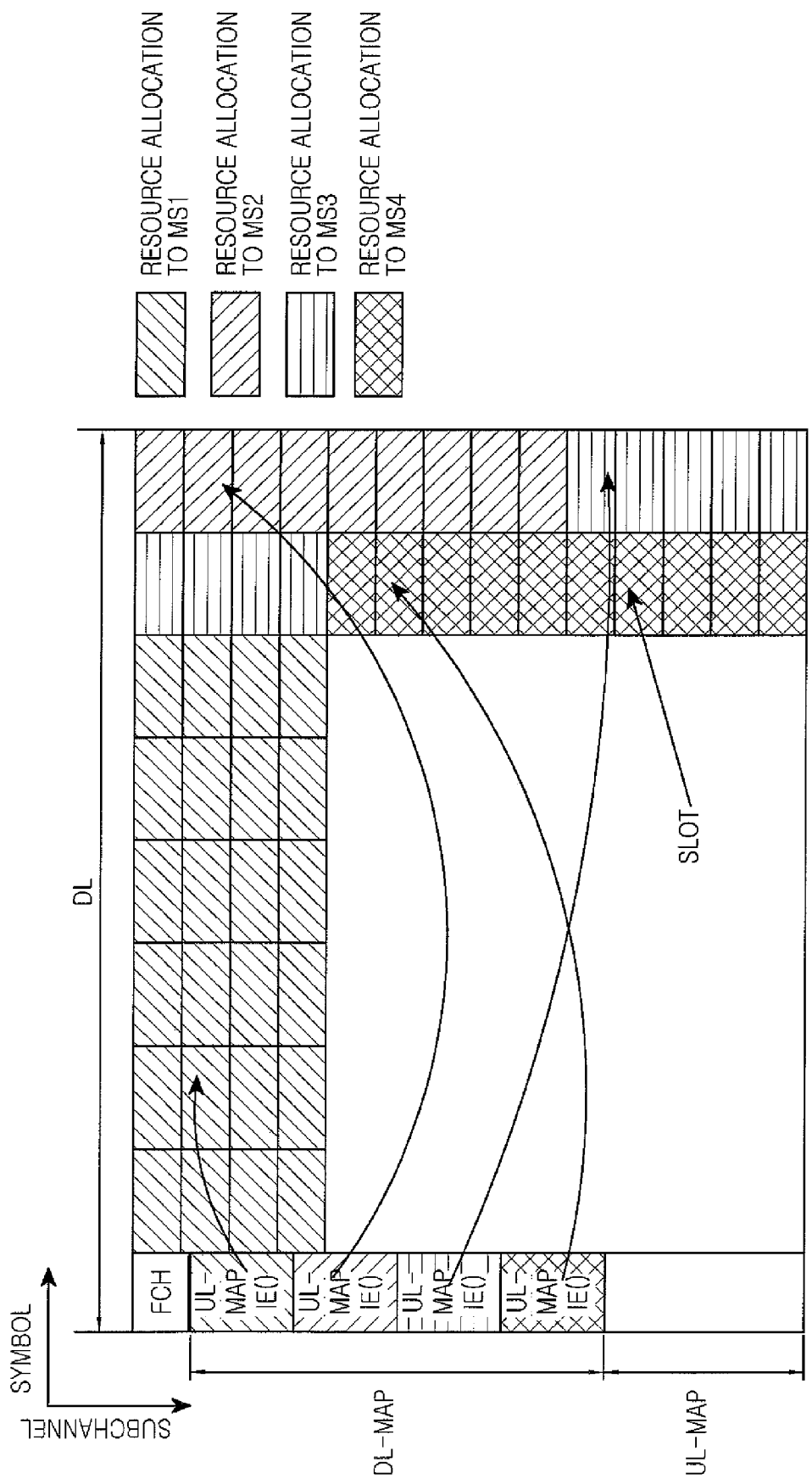
FIG. 10 is a view illustrating a downlink resource allocation method in a wireless communication system according to an exemplary embodiment of the present invention.

The PA based on frequency-axis slots is a scheme that allocates the remaining resources after general resource allocation to MSs requiring periodic resource allocation along the frequency axis in the time-reverse order. Referring to FIG. 10, assuming that resources are allocated to MS1 in the general manner and periodic resources are allocated to MS2, MS3 and MS4, the BS allocates a rectangle of 24 slots in a DL frame, starting from slot #1 to MS1. Starting from the first slot along the frequency axis in the time-reverse order, the BS allocates 9 slots to MS2, 9 slots counted from the 10th slot to MS3, and 10 slots counted from the 19th slot to MS4. Although the periodic resources are allocated along the frequency axis, that is, lengthwise in the time-reverse order, actual packet transmission is carried out in the order of time.

According to allocation types, a resource allocation message can be configured as illustrated in Table 1 below.

TABLE 1

| | |
|---|---|
| DL-MAP IE( ){ | |
|   Allocation Type | Identifier identifying a resource allocation type |
|   if (Allocation Type==0){ | General resource allocation |
|     DIUC | |
|     CID | |
|     OFDMA symbol offset | |
|     Subchannel offset | |
|     NO. OFDMA symbols | |
|     No. subchannels | |
|     Repetition coding indication | |
|   } | |
|   else if (Allocation Type==1){ | PA based on two-dimensional absolute coordinates |
|     DIUC | |
|     CID | |
|     OFDMA symbol offset | |
|     Subchannel offset | |
|     NO. OFDMA symbols | |
|     No. subchannels | |
|     Repetition coding indication | |
|     PA frame duration | |
|     PA period | |
|   } | |
|   else if (Allocation Type==2){ | PA based on time-reverse ordered slots |
|     DIUC | |
|     CID | |
|     Duration | |
|     Repetition coding indication | |
|     PA start offset | |
|     PA frame duration | |
|     PA period | |
|   } | |
|   else if (Allocation Type==3){ | PA based on frequency-axis slots |
|     DIUC | |
|     CID | |
|     Duration | |
|     Repetition coding indication | |
|     PA start offset | |
|     PA frame duration | |
|     PA period | |
|   } | |
| } | |

Referring to Table 1, the resource allocation message DL-MAP IE( ) of an exemplary embodiment of the present invention has a different configuration according to an allocation type. If Allocation Type is 0, it indicates the general resource allocation method. For Allocation Type 0, the resource allocation message includes Downlink Interval Usage Code (DIUC) indicating a processing scheme (e.g. a modulation and coding scheme) for a physical channel that delivers a downlink data burst, CID identifying a service and an MS, OFDMA symbol offset indicating the start of OFDMA symbols of the data burst, Subchannel Offset indicating the start of subchannels that carry the data burst, No. OFDMA symbols indicating the number of OFDMS symbols occupied for the data burst, No. Subchannels indicating the number of subchannels used for the data burst, and Repetition coding indication indicating the number of iterative codings.

If Allocation Type is 1, it indicates the PA based on two-dimensional absolute coordinates. For Allocation Type 1, the resource allocation message includes, in addition to the information included in the resource allocation message for Allocation Type=0, PA frame duration indicating the number of allocated frames and PA period indicating a period for which actual resources are allocated. If PA frame duration is 0, this means that the resource allocation ends.

Allocation Type 2 is PA based on time-reverse ordered slots and two-dimensional absolute coordinates and Allocation Type 3 is PA based on frequency-axis slots. For Allocation Type 2 and Allocation Type 3, the resource allocation message includes, in addition to DIUC, CID, and Repetition coding indication, Duration indicating the number of allocates slots, PA start offset indicating the start of the resource allocation, PA frame duration indicating the number of allocated frames, and PA period indicating a period for which actual resources are allocated. In the case of the PA based on time-reverse ordered slots, PA start offset indicates the start position of resource allocation, counted from the last slot. In the case of the PA based on frequency-axis slots, PA start offset indicates the start position of resource allocation, counted from the first slot on the frequency axis in the time reverse order.

Referring again to FIG. 4, the BS determines whether the downlink resource allocation has been completed for the MSs in step 411. If the downlink resource allocation is still going, the BS updates n to (n+1) in step 413 and returns to step 405. Upon completion of the downlink resource allocation, the BS generates MAP information using the generated resource allocation messages and broadcasts the MAP information in step 415. The BS may receive Acknowledgement (ACK) signals from the MSs.

Then the BS transmits downlink data according to the MAP information. Specifically, the BS determines whether resources have been allocated periodically or in the general manner to each of the MSs in step 417. In the case of periodic resource allocation, the BS transmits downlink data to the MS every predetermined period, for example, in slots allocated to the MS every Tp frames in step 419. That is, the BS transmits the downlink data to the MS in the predetermined resource area every predetermined period without transmitting the resource allocation message. On the other hand, in the case of general resource allocation, the BS transmits downlink data to the MS in a frame in step 421. Then the BS ends the algorithm of an exemplary embodiment of the present invention.

Figure 5:
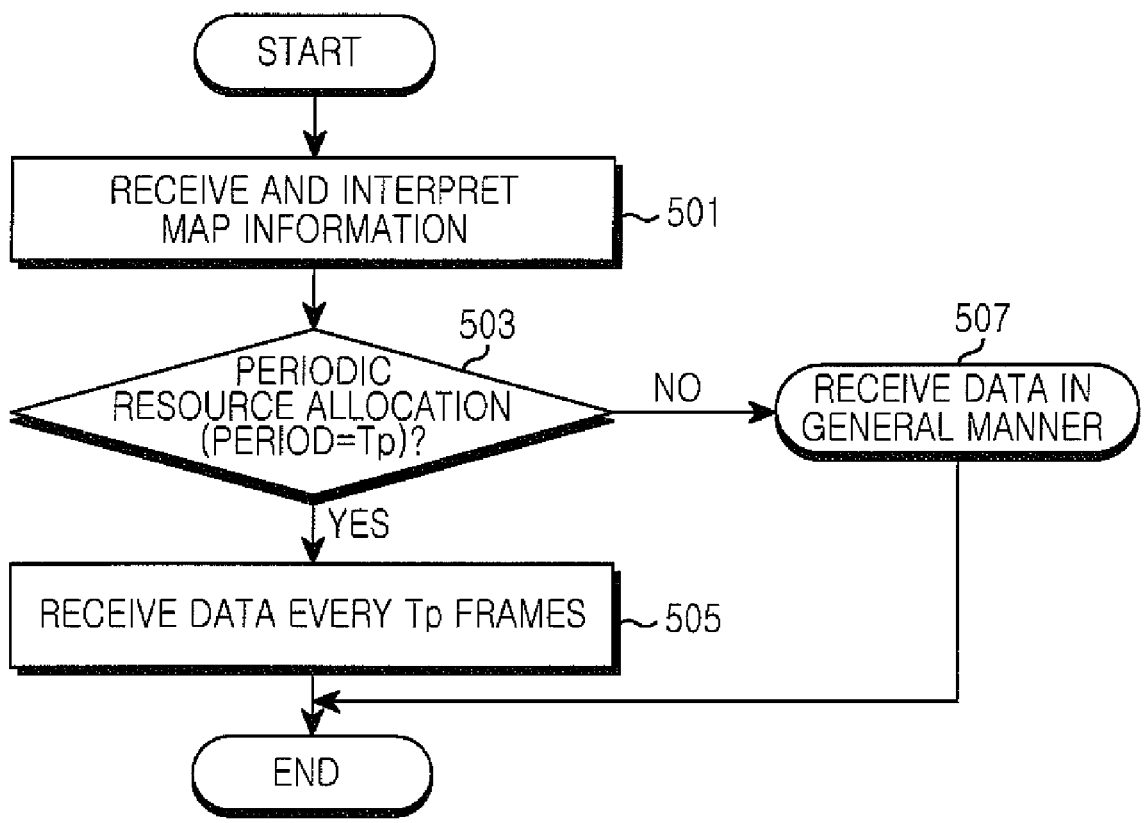
FIG. 5 is a flowchart illustrating an operation of an MS for receiving downlink data in a wireless communication system according to an exemplary embodiment of the present invention.

FIG. 5 is a flowchart illustrating an operation of an MS for receiving downlink data in a wireless communication system according to an exemplary embodiment of the present invention.

Referring to FIG. 5, an MS receives MAP information from a BS and determines whether downlink resources have been allocated to the MS by interpreting the MAP information in step 501.

In step 503, the MS determines whether the downlink resource allocation is periodic. In the case of periodic allocation, the MS extracts resource allocation information from the interpreted MAP information according to a resource allocation type and receives periodic downlink data in slots indicated by the extracted resource allocation information in step 505. In the case of general allocation, the MS receives downlink data in slots indicated by a resource allocation message included in the MAP information according to a general data reception method in step 507.

If the PA service is terminated for the MS, the BS reallocates the periodic resources used for the MS to another MS, thus reducing resource consumption. For example, resources are allocated to MS2, MS3 and MS4 in the PA method as illustrated in FIGS. 8, 9 and 10. Then if the periodic resource allocation ends for MS3, the BS can reallocate the periodic resources used for MS3 to MS2 and MS4 in the PA method.

If the MS temporarily discontinues the PA service, or if the BS has no more packets for the MS that receives the PA service, the BS can reallocate the periodic resources used for the MS to general MSs until the PA service of the MS resumes. This will be described below with reference to FIGS. 6 and 7.

Figure 6:
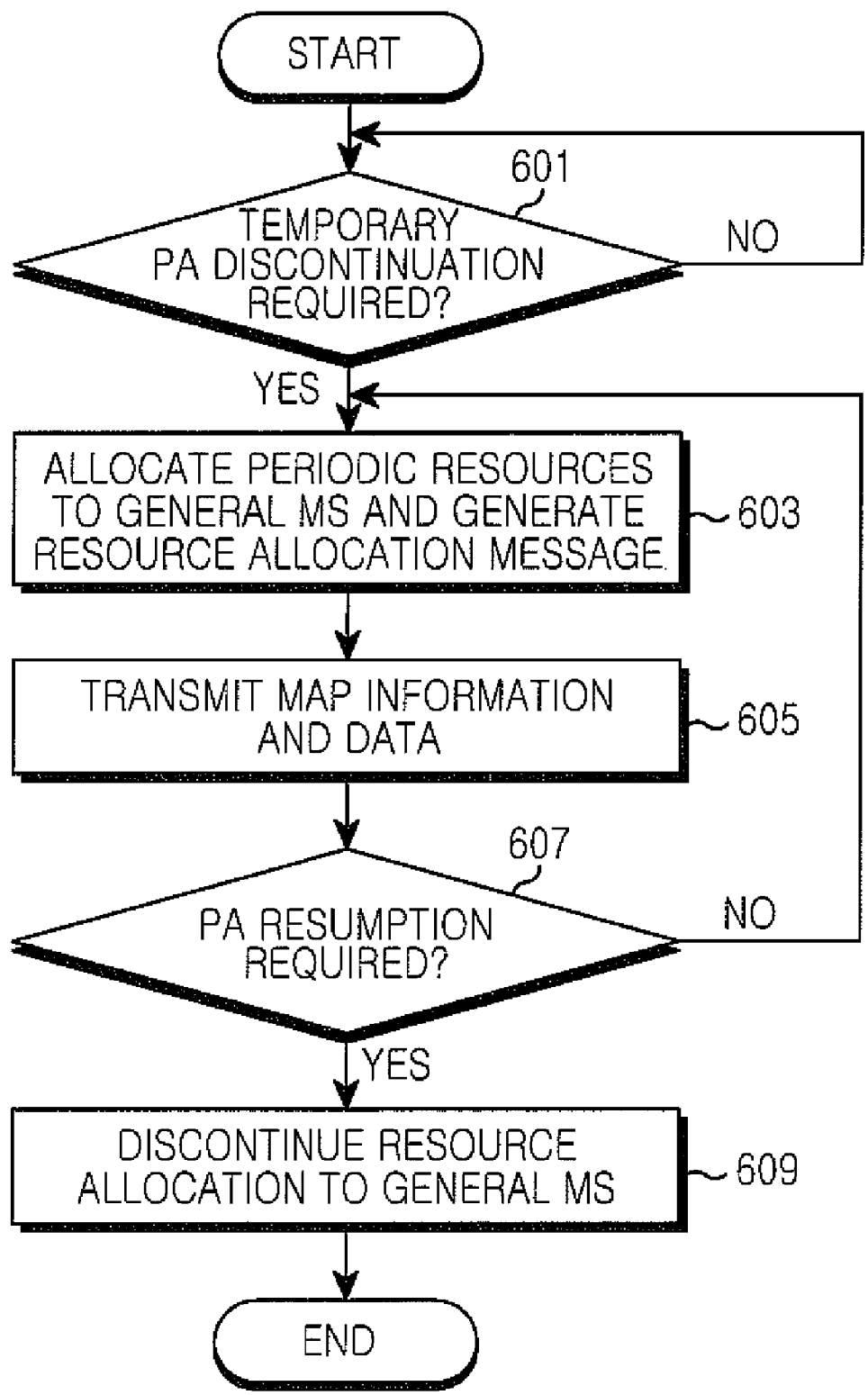
FIG. 6 is a flowchart illustrating an operation of a BS for temporarily discontinuing and resuming periodic downlink resource allocation in a wireless communication system according to an exemplary embodiment of the present invention.

FIG. 6 is a flowchart illustrating an operation of a BS for temporarily discontinuing and resuming PA in a wireless communication system according to an exemplary embodiment of the present invention.

Referring to FIG. 6, a BS determines whether PA needs to be discontinued temporarily for an MS in step 601. The BS may decide on temporary PA discontinuation when receiving a temporary PA discontinuation request from the MS or in the absence of periodic packets to be transmitted to the MS.

When deciding on temporary PA discontinuation, the BS allocates periodic resources of a frame to a general MS and generates a resource allocation message for the general MS in step 603. In step 605, the BS generates MAP information including the resource allocation message, broadcasts the MAP information to MSs, and transmits downlink data to the MSs according to the MAP information.

In step 607, the BS determines whether to resume the PA for the MS. The BS may decide on PA resumption upon receipt of a PA resumption request from the MS or upon generation of periodic packets to be transmitted to the MS.

If the BS determines not to resume the PA for the MS, the BS returns to step 603. On the other hand, when determining to resume the PA for the MS, the BS releases the periodic resources from the general MS and resumes the PA service with the periodic resources so that the MS can receive downlink data periodically without additional resource allocation in step 609. Then the BS ends the algorithm of an exemplary embodiment of the present invention.

Figure 7:
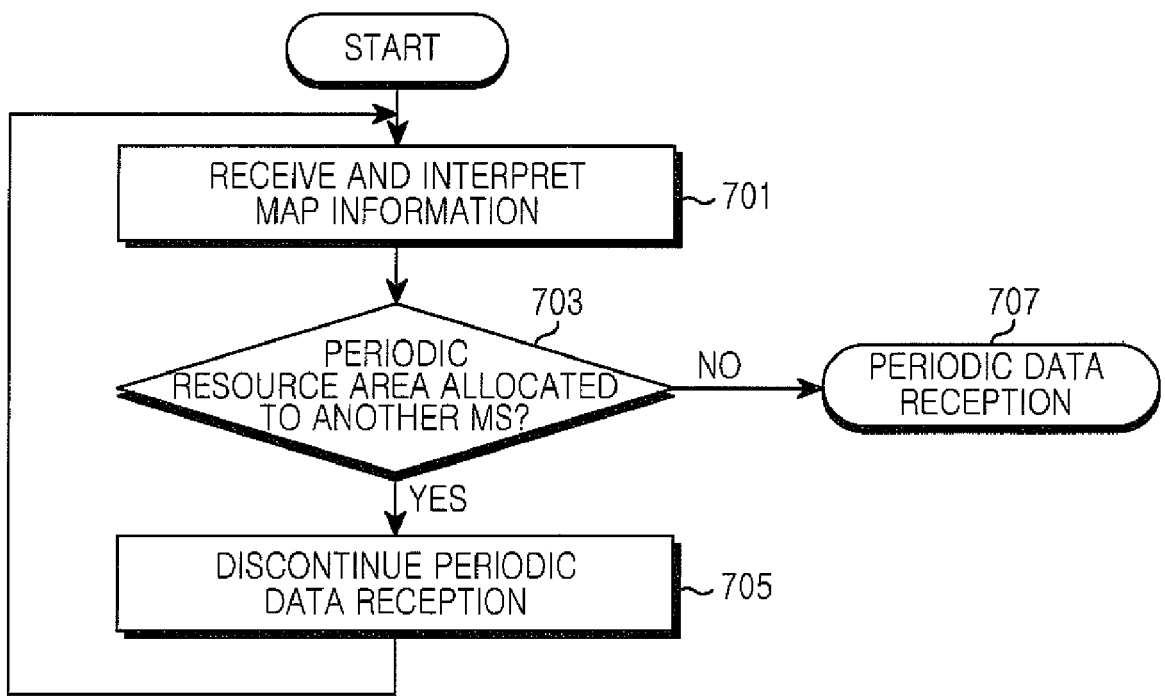
FIG. 7 is a flowchart illustrating an operation of an MS for receiving data when periodic downlink resource allocation is temporarily discontinued in a wireless communication system according to an exemplary embodiment of the present invention.

FIG. 7 is a flowchart illustrating an operation of an MS for receiving data when PA is temporarily discontinued in a wireless communication system according to an exemplary embodiment of the present invention.

Referring to FIG. 7, during a service through PA, an MS receives MAP information from the BS and determines whether downlink resources have been allocated to the MS by interpreting the MAP information in step 701. The MS can request temporary service discontinuation, i.e. temporary PA discontinuation to the BS. Thus the BS can allocate the period resources of the BS to a general MS until the service resumes, generate MAP information correspondingly, and broadcast the MAP information.

In step 703, the MS determines whether the periodic resources of the MS have been allocated to another MS. If the periodic resources are still available to the MS, the MS receives periodic data in a downlink resource area allocated to the MS.

If the period resources have been allocated to another MS, the MS discontinues the periodic data reception, i.e. the service, considering that the PA is temporarily discontinued in a current frame in step 705. The MS then returns to step 701 and monitors MAP information received from the BS to determine whether the service will resume. If the MAP information does not indicate that the period resources of the MS have been allocated to another MS, the MS may determine that the PA resumes in step 707. The MS can request resumption of the service so that BS resumes the PA, generates MAP information correspondingly, and broadcasts the MAP information to MSs.

In accordance with certain exemplary embodiments of the present invention as described above, a BS broadcasts resource allocation information for the first time once for an MS to which downlink data will be transmitted periodically and then transmits the downlink data to the MS in an allocated resource area every predetermined period without broadcasting the resource allocation information for the MS in a wireless communication system. Because the BS does not need to transmit the resource allocation information to the MS every time, downlink resources can be saved from the resource allocation information. Especially for a service characterized by periodic packet generation such as VoIP, the efficiency of downlink resources can be increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating resources in a Base Station (BS) in a wireless communication system, the method comprising:
    determining whether periodic data transmission is required for Mobile Stations (MSs);
    allocating to the MSs periodic downlink resources with a predetermined period;
    generating resource allocation messages with resource allocation information for the MSs; and
    transmitting control information including the resource allocation messages to the MSs,
    wherein each of the resource allocation messages comprises at least one of an amount of resources, a start of the resources, an allocation duration, and a transmission period, and
    wherein the periodic downlink resources are downlink resources in which the BS transmits downlink data to the MSs each predetermined period without transmitting the resource allocation messages to the MSs every predetermined period.

2. The method of claim 1, wherein the allocating of the periodic downlink resources comprises:
    selecting the MSs to receive the downlink resources periodically; and
    allocating the periodic downlink resources to the selected MSs based on two-dimensional absolute coordinates.

3. The method of claim 1, wherein the allocating of the periodic downlink resources comprises:
    selecting the MSs to receive the downlink resources periodically; and
    allocating the periodic downlink resources to the selected MSs in a time reverse order, starting from a last slot of a downlink frame.

4. The method of claim 1, wherein the allocating of the periodic downlink resources comprises:
    selecting the MSs to receive the downlink resources periodically; and
    allocating the periodic downlink resources to the selected MSs along a frequency axis in a time reverse order of a downlink frame.

5. The method of claim 1, wherein the MSs have requested a service characterized by periodic packet generation.

6. The method of claim 1, wherein the control information comprises MAP information.

7. The method of claim 1, further comprising transmitting downlink data to each of the MSs in a predetermined period using the allocated periodic downlink resources.

8. The method of claim 1, further comprising, when the periodic downlink resource allocation ends for an MS among the MSs, reallocating periodic downlink resources used for the MS to the other MSs.

9. The method of claim 1, further comprising, when the periodic downlink resource allocation ends or is temporarily discontinued for an MS among the MSs, reallocating periodic downlink resources used for the MS to another MS.

10. The method of claim 9, further comprising ending or temporarily discontinuing the periodic downlink resource allocation for the MS, upon receipt of a request for temporarily discontinuing the periodic downlink resource allocation from the MS.

11. The method of claim 9, further comprising, when the ended or temporarily discontinued periodic downlink resource allocation resumes, discontinuing allocation of the periodic resources to the another MS.

12. The method of claim 11, further comprising resuming the periodic downlink resource allocation for the MS, upon receipt of a request for resuming the periodic downlink resource allocation from the MS.

13. The method of claim 9, wherein a resource allocation message transmitted to the another MS comprises at least one of an amount of resources and a start of the resources.

14. A method for receiving data in a Mobile Station (MS) in a wireless communication system, the method comprising:
    receiving and interpreting control information from a Base Station (BS); and
    receiving downlink data using periodic downlink resources allocated to the MS with a predetermined period, when the downlink resources are allocated periodically,
    wherein the control information comprises a resource allocation message with resource allocation information for the MS,
    wherein the resource allocation message comprises at least one of an amount of resources, a start of the resources, an allocation duration, and a transmission period, and
    wherein the periodic downlink resources are downlink resources in which the MS receives downlink data from the BS each predetermined period without receiving the resource allocation message from the BS every predetermined period.

15. The method of claim 14, wherein the control information comprises MAP information.

16. The method of claim 14, further comprising transmitting a request for temporarily discontinuing the periodic downlink resource allocation to the BS, when a service to which the periodic downlink resources are allocated is temporarily discontinued.

17. The method of claim 16, further comprising transmitting a request for resuming the periodic downlink resource allocation to the BS, when the temporarily discontinued service resumes.

18. An apparatus for allocating resources in a Base Station (BS) in a wireless communication system, comprising:
    a resource allocator for determining whether periodic data transmission is required for Mobile Stations (MSs), and for allocating to the MSs periodic downlink resources with a predetermined period; and a control information generator for generating resource allocation messages with resource allocation information for the MSs, and for generating control information including the resource allocation messages, wherein each of the resource allocation messages comprises at least one of an amount of resources, a start of the resources, an allocation duration, and a transmission period, and wherein the periodic downlink resources are downlink resources in which the BS transmits downlink data to the MSs each predetermined period without transmitting the resource allocation messages to the MSs every predetermined period.

19. The apparatus of claim 18, further comprising:
a data transmitter for transmitting downlink data to the MSs using the allocated periodic downlink resources in a predetermined period; and
a control information transmitter for transmitting the control information to the MSs.

20. The apparatus of claim 18, wherein the resource allocator allocates the periodic downlink resources to the MSs, when the MSs request a service characterized by periodic packet generation.

21. The apparatus of claim 18, wherein the resource allocator allocates the periodic downlink resources to the MSs based on two-dimensional absolute coordinates.

22. The apparatus of claim 18, wherein the resource allocator allocates the periodic downlink resources to the MSs, in a time reverse order, starting from a last slot of a downlink frame.

23. The apparatus of claim 18, wherein the resource allocator allocates the periodic downlink resources to the MSs, along a frequency axis in a time reverse order of a downlink frame.

24. The apparatus of claim 18, wherein the control information comprises MAP information.

25. The apparatus of claim 18, wherein when the periodic downlink resource allocation ends for an MS among the MSs, the resource allocator reallocates periodic downlink resources used for the MS to the other MSs.

26. The apparatus of claim 18, wherein when the periodic downlink resource allocation ends or temporarily is discontinued for an MS among the MSs, the resource allocator reallocates periodic downlink resources used for the MS to another MS.

27. The apparatus of claim 26, wherein a resource allocation message transmitted to the another MS comprises at least one of the amount of resources and the start of the resources.

28. The apparatus of claim 26, wherein upon receipt of a request for temporarily discontinuing the periodic downlink resource allocation from the MS, the resource allocator ends or temporarily discontinues the periodic downlink resources for the MS.

29. The apparatus of claim 26, wherein when the ended or temporarily discontinued periodic downlink resource allocation resumes, the resource allocator discontinues allocation of the periodic resources to the another MS.

30. The apparatus of claim 29, wherein upon receipt of a request for resuming the periodic downlink resource allocation from the MS, the resource allocator resumes the periodic downlink resource allocation for the MS.

31. An apparatus for receiving data in a Mobile Station (MS) in a wireless communication system, comprising:
a control information interpreter for interpreting control information received from a Base Station (BS); and
a data receiver for, when periodic downlink resources are allocated periodically to the MS, receiving downlink data using the allocated periodic downlink resources with a predetermined period, wherein the control information comprises a resource allocation message with resource allocation information for the MS, wherein the resource allocation message comprises at least one of an amount of resources, a start of the resources, an allocation duration, and a transmission period, and wherein the periodic downlink resources are downlink resources in which the MS receives downlink data from the BS each predetermined period without receiving the resource allocation message from the BS every predetermined period.

32. The apparatus of claim 31, wherein the control information comprises MAP information.

33. The apparatus of claim 31, further comprising a control information receiver for receiving the control information from the BS.

34. The apparatus of claim 31, further comprising a transmitter for transmitting a request for temporarily discontinuing the periodic downlink resource allocation to the BS, when a service to which the periodic downlink resources are allocated is temporarily discontinued.

35. The apparatus of claim 34, wherein when the temporarily discontinued service resumes, the transmitter transmits a request for resuming the periodic downlink resource allocation to the BS.

36. A method for allocating resources in a Base Station (BS) in a wireless communication system, the method comprising:
generating periodically resource allocation messages with resource allocation information for MSs, the resource allocation messages for allocating to the MSs periodic resources with a predetermined period; and
transmitting control information including the resource allocation messages to the MSs,
wherein each of the resource allocation messages comprises at least one of an amount of resources, a start of the resources, an allocation duration, and a transmission period, and
wherein the periodic resources are resources in which the BS and the MSs communicate data each predetermined period without transmitting the resource allocation messages to the MSs every predetermined period.

37. An apparatus for allocating resources in a Base Station (BS) in a wireless communication system, the apparatus comprising:
means for generating periodically resource allocation messages with resource allocation information for MSs, the resource allocation messages for allocating to the MSs periodic resources with a predetermined period; and
means for transmitting control information including the resource allocation messages to the MSs,
wherein each of the resource allocation messages comprises at least one of an amount of resources, a start of the resources, an allocation duration, and a transmission period, and
wherein the periodic resources are resources in which the BS and the MSs communicate data each predetermined period without transmitting the resource allocation messages to the MSs every predetermined period.

38. A method for receiving data in a Mobile Station (MS) in a wireless communication system, the method comprising:
receiving control information from a Base Station (BS); and
receiving downlink data using periodic downlink resources allocated to the MS with a predetermined period,
wherein the control information comprises a resource allocation message with resource allocation information for the MS, wherein the resource allocation message comprises at least one of an amount of resources, a start of the resources, an allocation duration, and a transmission period, and wherein the periodic downlink resources are downlink resources in which the MS receives downlink data from the BS each predetermined period without receiving the resource allocation message from the BS every predetermined period.

39. An apparatus for receiving data in a Mobile Station (MS) in a wireless communication system, the method comprising:

means for receiving control information from a Base Station (BS); and means for receiving downlink data using periodic downlink resources allocated to the MS with a predetermined period, wherein the control information comprises a resource allocation message with resource allocation information for the MS, wherein the resource allocation message comprises at least one of an amount of resources, a start of the resources, an allocation duration, and a transmission period, and wherein the periodic downlink resources are downlink resources in which the MS receives downlink data from the BS each predetermined period without receiving the resource allocation message from the BS every predetermined period.

* * * * *